G. H. RENTZ.
ANTISEPTIC INSTRUMENT CASE.
APPLICATION FILED DEC. 15, 1913.
1,143,436.
Patented June 15, 1915.
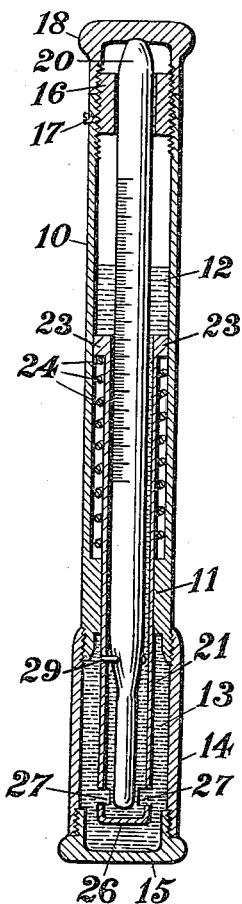
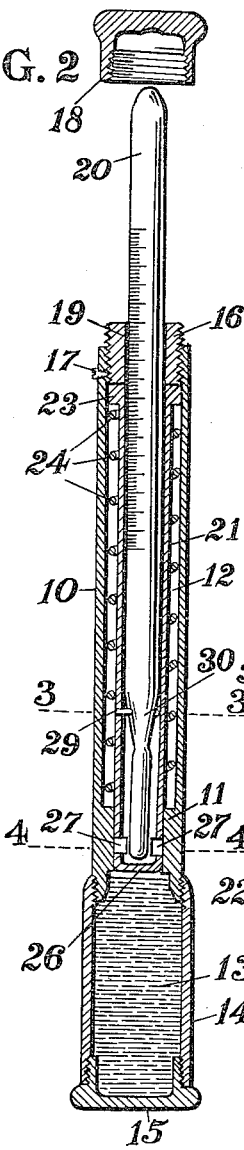
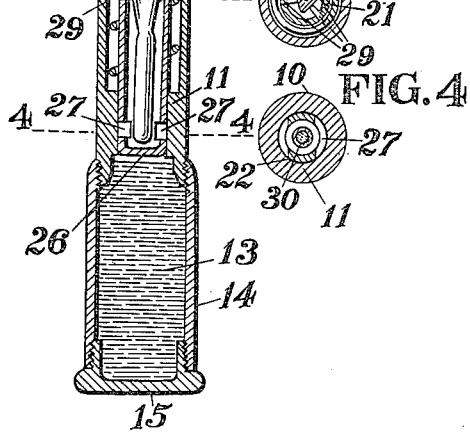
WITNESSES:
B. Whittemore
H. A. Bowman.
INVENTOR
George H. Rentz
BY
F. A. Whitley
ATTORNEY
THE NORRIS PETERS CO., PHOTO-LITHO., WASHINGTON, D. C.

UNITED STATES PATENT OFFICE.

GEORGE H. RENTZ, OF MINNEAPOLIS, MINNESOTA.

ANTISEPTIC INSTRUMENT-CASE.

1,143,436. Specification of Letters Patent. Patented June 15, 1915.

Application filed December 15, 1913. Serial No. 806,668.

*To all whom it may concern:*

Be it known that I, GEORGE H. RENTZ, a citizen of the United States, residing at Minneapolis, in the county of Hennepin and State of Minnesota, have invented certain new and useful Improvements in Antiseptic Instrument-Cases, of which the following is a specification.

My invention relates to antiseptic instrument cases designed primarily to hold clinical thermometers, and has for its object to provide a case which will be neat and attractive in appearance and has small compartments in which said instruments can be carried in the pocket with safety and convenience and which will render and maintain the same in an antiseptic condition thus preventing the possibility of germ conveyance from one patient to another by the thermometer or instruments incased.

The full objects and advantages of my invention will appear in connection with the detailed description thereof and are particularly pointed out in the claims.

In the drawings, illustrating the application of my invention in one form, Figure 1 is a vertical sectional view showing the case closed and the thermometer within the same. Fig. 2 is a view similar to Fig. 1 with the case open and the thermometer projected. Fig. 3 is a section on line 3—3 of Fig. 2. Fig. 4 is a section on line 4—4 of Fig. 2.

As illustrated, an outer casing 10 is provided which may be composed of hard rubber, metal or other material, as desired, and preferably, as shown in Figs. 3 and 4, will be cylindrical in cross section. The casing 10 is hollow and is provided with a thickened portion 11 near one end thereof above which is a cylindrical cavity 12. Below the thickened portion 11 is another cylindrical cavity 13 which may be formed by a cylindrical member 14 screwed to the bottom of the casing 10, the cavity 13 being closed by a cap 15 which is threaded into the extension casing 14. The top of casing 10 will preferably be partially closed by a tubular plug 16 which is threaded into the interior casing 10 and is fixed in position by means of a screw 17, a portion of the threaded plug 16 extending beyond the end of casing 10 to which a cap 18 may be secured. The plug 16 is provided with a central bore 19 of sufficient size to admit the introduction of an instrument such as a thermometer 20 through said plug and into the casing.

Within the cavity 12 is a tubular member 21 which is of such a diameter as to exactly register in the opening 22 through the thickened portion 11 of the casing 10. The tubular member 21 has at the upper end thereof a flange-like head 23. Surrounding the tubular member 21 within chamber 12 and engaging shoulders of head 23 and thickened portion 11 is a spiral spring 24 normally tending to hold the head 23 in engagement with the plug 16. The tubular member 21 is closed at its lower end by a cap 26 and is provided with openings 27 above said cap by means of which a liquid in the chamber 13 may be admitted within the tubular member. The tubular member is also provided with a plurality of pins 29, as best shown in Fig. 3. A suitable number of pins 29 is three and the ends thereof are spaced from one another so as to admit the tapering end 30 of the thermometer or other instrument 20 and hold the same positioned within the tube 21 in such manner that the mercury bulb of the thermometer will not engage any part of said tube and yet will be positioned to be surrounded by the antiseptic liquid in chamber 13 when the tube 21 is pushed down.

The operation of my device will be obvious. The thermometer 20 is inserted through the opening 19 in plug 16 until the walls of the tapering portion 30 thereof engage the pins 29. Further pressure upon the end of thermometer 20 will depress the tube 21 compressing spring 24. The tube 21 is thereby projected so as to bring the openings 27 into the chamber 13 and the antiseptic liquid therein, which immediately passes through said openings within the tube and about the lower portion of the thermometer. The cap 18 is then screwed into position and the thermometer is completely incased and held safe from injury and subject to the antiseptic fluid within the chamber 13. When it is desired to remove the thermometer the cap 18 is unscrewed, whereby the spring 24 moves the tube 21 until head 23 engages plug 16 thereby projecting the thermometer 20 and bringing the openings 27 in the tube into the bore in the thickened portion 11 of the casing so that the antiseptic liquid in chamber 13 is effectively sealed within said chamber.

I claim:

1. A thermometer case comprising a tubular casing provided with a thickened portion intermediate its ends having a central bore and forming an enlarged chamber for liquid in its lower end, a tube of the same diameter as said bore slidably mounted in said casing and through the bore with the walls of the tube in contact with the bore, said tube being adapted to receive the end of the thermometer and having a closed inner end provided with side openings adjacent thereto, and a spring normally holding the tube so as to bring said openings within the bore and in engagement with the walls thereof so as to close communication between the slidable tube and the interior of the casing.

2. A thermometer case comprising a tubular casing provided with a thickened portion intermediate its ends having a central bore, and forming an enlarged chamber for liquid in its lower end, a tube of the same diameter as said bore slidably mounted in said casing and through the bore with the walls of the tube in contact with the bore, said tube being adapted to receive the end of the thermometer and having a closed inner end provided with side openings adjacent thereto, said tube having a shouldered head about its upper end fitted to the walls of the casing, and a spring surrounding the tube between said shouldered head and the thickened portion for normally holding the tube so as to bring said openings within the bore and in engagement with the walls thereof so as to close communication between the slidable tube and the interior of the casing.

3. A thermometer case comprising a tubular casing provided with a thickened portion intermediate its ends having a central bore, a tube of the same diameter as said bore slidably mounted in said casing and through the bore with the walls of the tube in contact with the bore, said tube being adapted to receive the end of the thermometer and having a closed inner end provided with side openings adjacent thereto, a spring normally holding the tube so as to bring said openings within the bore and in engagement with the walls thereof so as to close communication between the slidable tube and the interior of the casing, and means within the tube for engaging the thermometer at a point removed from the end thereof and holding the same out of contact with the closed end of the tube.

4. A thermometer case comprising a tubular casing provided with a thickened portion intermediate its ends having a central bore, and forming an enlarged chamber for liquid in its lower end, a tube of the same diameter as said bore slidably mounted in said casing and through the bore with the walls of the tube in contact with the bore, said tube being adapted to receive the end of the thermometer and having a closed inner end provided with side openings adjacent thereto, a spring normally holding the tube so as to bring said openings within the bore and in engagement with the walls thereof so as to close communication between the slidable tube and the interior of the casing, and a plurality of pins within the tube for engaging the thermometer at a point removed from the end thereof and holding the same out of contact with the end of the tube.

In testimony whereof I affix my signature in presence of two witnesses.

GEORGE H. RENTZ.

Witnesses:
F. A. WHITELEY,
H. A. BOWMAN.

Copies of this patent may be obtained for five cents each, by addressing the "Commissioner of Patents, Washington, D. C."